(12) United States Patent
Schultz et al.

(10) Patent No.: US 11,615,949 B2
(45) Date of Patent: Mar. 28, 2023

(54) AUTOMATED INLINE PREPARATION AND DEGASSING OF VOLATILE SAMPLES FOR INLINE ANALYSIS

(71) Applicant: Elemental Scientific, Inc., Omaha, NE (US)

(72) Inventors: Austin Schultz, Omaha, NE (US); Daniel R. Wiederin, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 0 days.

(21) Appl. No.: 17/704,739

(22) Filed: Mar. 25, 2022

(65) Prior Publication Data

US 2022/0328297 A1    Oct. 13, 2022

Related U.S. Application Data

(63) Continuation of application No. 17/028,115, filed on Sep. 22, 2020, now Pat. No. 11,315,776.

(60) Provisional application No. 62/908,959, filed on Oct. 1, 2019.

(51) Int. Cl.
*G01N 1/28* (2006.01)
*H01J 49/04* (2006.01)

(52) U.S. Cl.
CPC ............ *H01J 49/0431* (2013.01); *G01N 1/28* (2013.01)

(58) Field of Classification Search
CPC ...... H01J 49/0431; H01J 49/105; G01N 1/28; G01N 35/1097
See application file for complete search history.

(56) References Cited

U.S. PATENT DOCUMENTS 3,255,575 A * 6/1966 Roberts .................... G01N 1/28
   422/537
4,326,940 A    4/1982 Eckles et al.
5,183,486 A    2/1993 Gatten et al.
5,259,254 A    11/1993 Zhu et al.
(Continued)

FOREIGN PATENT DOCUMENTS

CN    106794396 A    5/2017
JP    2016532263 A    10/2016
(Continued)

OTHER PUBLICATIONS

Office Action for Taiwanese Application No. 109134015, dated Jul. 30, 2021.
(Continued)

*Primary Examiner* — David J Bolduc
(74) *Attorney, Agent, or Firm* — Kevin E. West; Advent, LLP (57) ABSTRACT

An analysis system includes a degassing cell, at least one first valve, and at least one second valve. The at least one first valve is fluidly coupled with a top of the degassing cell, the at least one first valve configured selectably connect the degassing cell to a displacement gas flow and to a vacuum source. The at least one second valve is fluidly connected with a lateral side of the degassing cell and separately fluidly connected with a bottom of the degassing cell. The at least one second valve is selectably coupled with any of a source of a sample-carrying fluid, a transfer line configured to deliver a sample to an analysis device, or a waste output.

17 Claims, 5 Drawing Sheets

(56) References Cited

U.S. PATENT DOCUMENTS

| | | | |
|---|---|---|---|
| 5,279,647 | A | 1/1994 | Gatten et al. |
| 5,290,340 | A | 3/1994 | Gatten et al. |
| 6,197,595 | B1 | 3/2001 | Anderson et al. |
| 7,910,074 | B2 | 3/2011 | Li et al. |
| 2006/0222569 | A1* | 10/2006 | Barten ............... G01N 1/28 422/400 |
| 2011/0189715 | A1 | 8/2011 | Likuski et al. |
| 2015/0027203 | A1* | 1/2015 | Trainoff ............ G01N 21/47 356/337 |
| 2017/0274379 | A1 | 9/2017 | Heitmann et al. |
| 2018/0015398 | A1* | 1/2018 | Mull ................. B01D 35/30 |
| 2018/0188281 | A1 | 7/2018 | Drews |
| 2019/0206663 | A1 | 7/2019 | Wiederin et al. |

FOREIGN PATENT DOCUMENTS

| | | |
|---|---|---|
| KR | 20140009645 A | 1/2014 |
| TW | 200906479 A | 2/2009 |
| TW | 201828222 A | 8/2018 |
| WO | 2018128847 A1 | 7/2018 |

OTHER PUBLICATIONS

PCT International Search Report and Written Opinion for PCT/US2020/051953, dated Jan. 8, 2021.

* cited by examiner

AUTOMATED INLINE PREPARATION AND DEGASSING OF VOLATILE SAMPLES FOR INLINE ANALYSIS

CROSS-REFERENCE TO RELATED APPLICATIONS

The present application is a continuation under 35 U.S.C. § 120 of U.S. patent application Ser. No. 17/028,115, filed Sep. 22, 2020, and titled "AUTOMATED INLINE PREPARATION AND DEGASSING OF VOLATILE SAMPLES FOR INLINE ANALYSIS," which in turn claims the benefit under 35 U.S.C. § 119(e) of U.S. Provisional Application Ser. No. 62/908,959, filed Oct. 1, 2019, and titled "AUTOMATED INLINE PREPARATION AND DEGASSING OF VOLATILE SAMPLES FOR INLINE ANALYSIS." U.S. patent application Ser. No. 17/028,115 and U.S. Provisional Application Ser. No. 62/908,959 are herein incorporated by reference in their entireties.

BACKGROUND

In many laboratory settings, it is often necessary to analyze a large number of chemical or biological samples at one time. In order to streamline such processes, the manipulation of samples has been mechanized. Such mechanized sampling can be referred to as autosampling and can be performed using an automated sampling device, or autosampler.

Inductively Coupled Plasma (ICP) spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

Sample introduction systems may be employed to introduce the liquid samples into the ICP spectrometry instrumentation (e.g., an Inductively Coupled Plasma Mass Spectrometer (ICP/ICP-MS), an Inductively Coupled Plasma Atomic Emission Spectrometer (ICP-AES), or the like), or other sample detector or analytic instrumentation for analysis. For example, a sample introduction system may withdraw an aliquot of a liquid sample from a container and thereafter transport the aliquot to a nebulizer that converts the aliquot into a polydisperse aerosol suitable for ionization in plasma by the ICP spectrometry instrumentation. The aerosol is then sorted in a spray chamber to remove the larger aerosol particles. Upon leaving the spray chamber, the aerosol is introduced into the plasma by a plasma torch assembly of the ICP-MS or ICP-AES instruments for analysis.

DRAWINGS

The Detailed Description is described with reference to the accompanying figures.

DETAILED DESCRIPTION

Overview

In various analysis systems, a transfer fluid, such as ammonium hydroxide ($NH_4OH$), can be used as a transfer solution to convey a sample from a loop inlet to a waste loop or nebulizer. In an embodiment, the transfer fluid can be 29% $NH_4OH$. The solution can still be under pressure, and, if an analysis is started right away without waiting for the sample to depressurize, the plasma can be extinguished. Depressurization can cause the $NH_4OH$ to flow to waste or nebulizer, depending on the valve position.

The example analysis system 1000 shown in FIGS. 1-6 can help to illustrate an issue that can arise with the development of bubbles and/or voids. The analysis system 1000 can include a loop inlet 1010, a tubing 1020 (shown straight for ease of illustration but which may, for example, be in the form of a loop of tubing), and a loop outlet 1030, which may be in the form of, for example, a nebulizer and/or a waste loop. The tubing 1020 can be configured to receive and facilitate the transmission of a sample-carrying fluid S2 (e.g., sample material carried in a carrier fluid, such as $NH_4OH$) therethrough. While waiting for the depressurization, many tiny bubbles 1040 (e.g., diameter less than half the diameter of the tubing 1020) can form on the sides of the tubing 1020 extending between the loop inlet 1010 and the loop outlet 1030 (e.g., in the form of a waste loop and/or a nebulizer).

Figure 1:
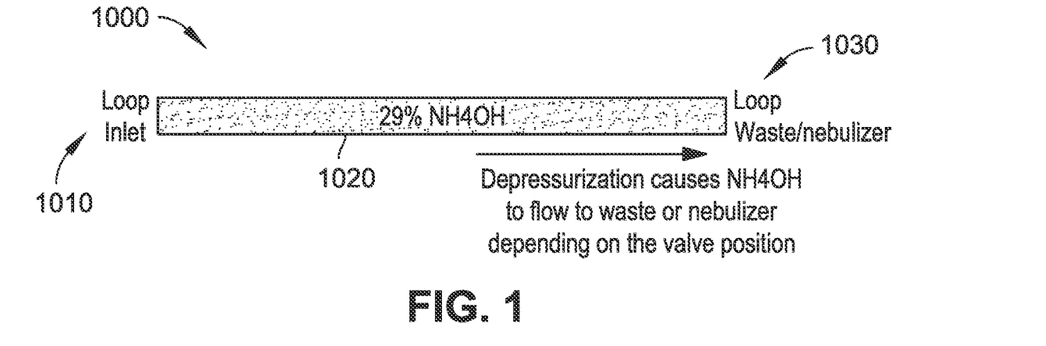
FIGS. 1-6 are a series of environmental views illustrating a process by which a sample carrier fluid can first form bubbles that can agglomerate and potentially form voids within tubing associated with an analysis system.
Figure 2:
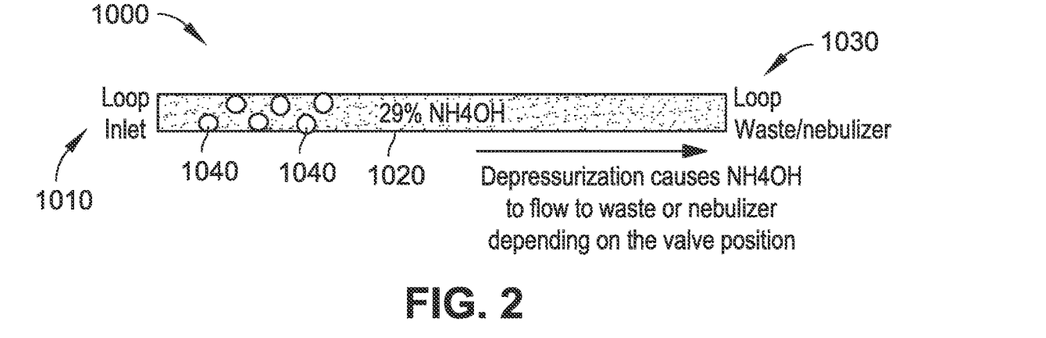
Figure 3:
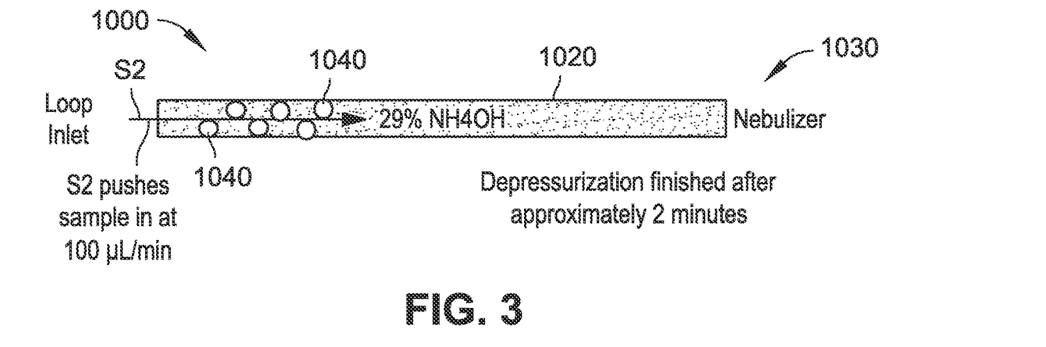
Figure 4:
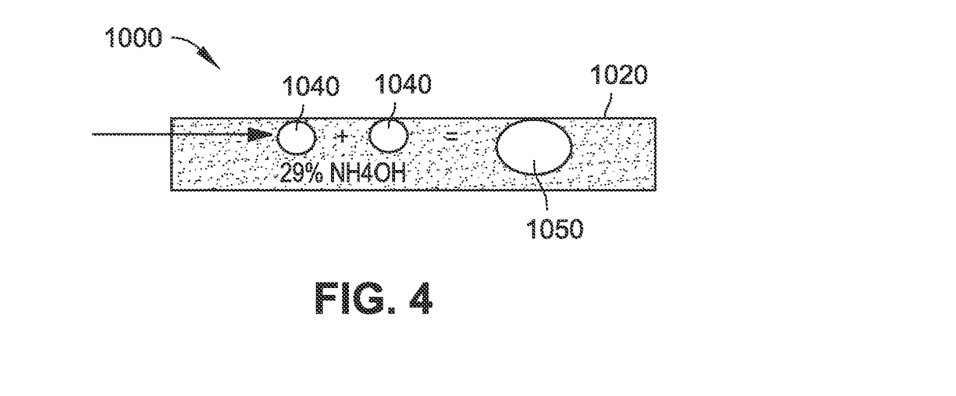
Figure 5:
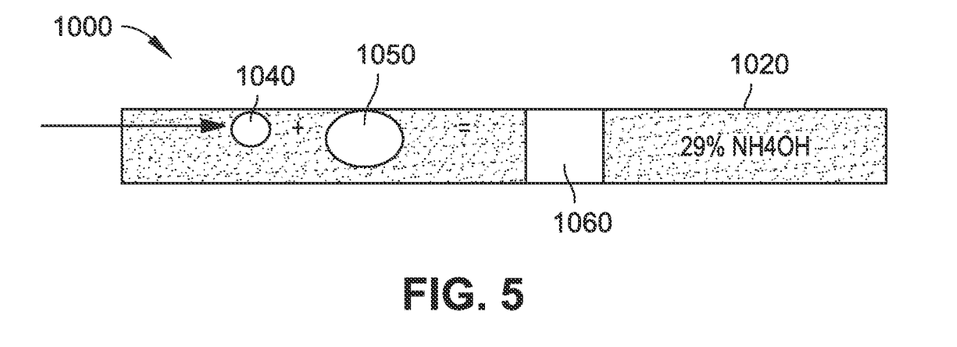
Figure 6:
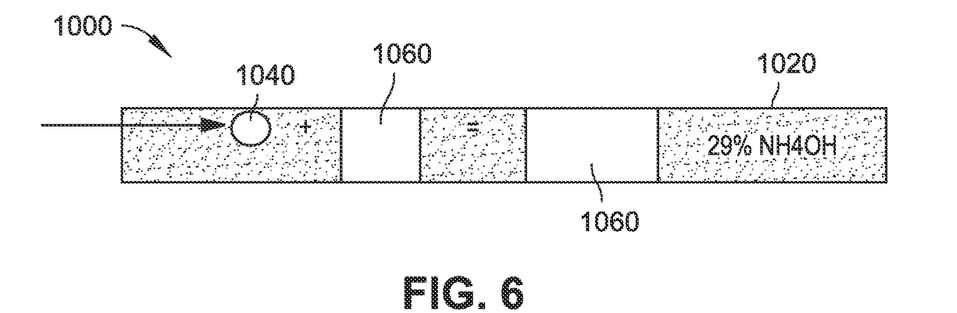

As can be seen in FIG. 1, when beginning depressurization, no bubbles 1040 may exist in the tubing 1020. Per FIG. 2, at the start of the analysis the sample S2 can be stable with some bubbles 1040 forming, yet no or substantially no bubbles 1040 are able to make it into the nebulizer and/or the ICPMS. In an embodiment, as shown in FIG. 3, depressurization can be expected to be finished after approximately two minutes, with a sample flow (e.g., 100 μL/min) then beginning in the tubing 1020. As can be seen from FIG. 4, some of the small bubbles 1040 can get pushed together by the flow in the small-diameter tubing 1020 and start to form larger bubbles 1050 (e.g., larger than the small bubbles 1040 and possibly of a diameter greater than half the diameter of the tubing 1020). Per FIGS. 5 and 6, eventually enough bubbles 1040 and/or 1050 may push together to form a void 1060 in the liquid sample S2.

The void 1060 can be defined as a lack of sample fluid within the tubing 1020 that extends the full diameter of the tubing 1020. In an embodiment, the void 1060 may be in the form of a gas pocket within the tubing 1020. As this void 1060 gets pushed down the line, it can grow as it adds more bubbles 1040, 1050 (as particularly illustrated in FIG. 6) and/or other voids 1060 to itself. In some embodiments, there may be about 5-6 of these large voids 1060 in the loop or flow path section 1020 at a given time. Considering such issues, an approach is needed for degassing a sample at a remote position to deter bubbles from agglomerating to form voids within the transport tubing.

Example Implementations

Figure 7:
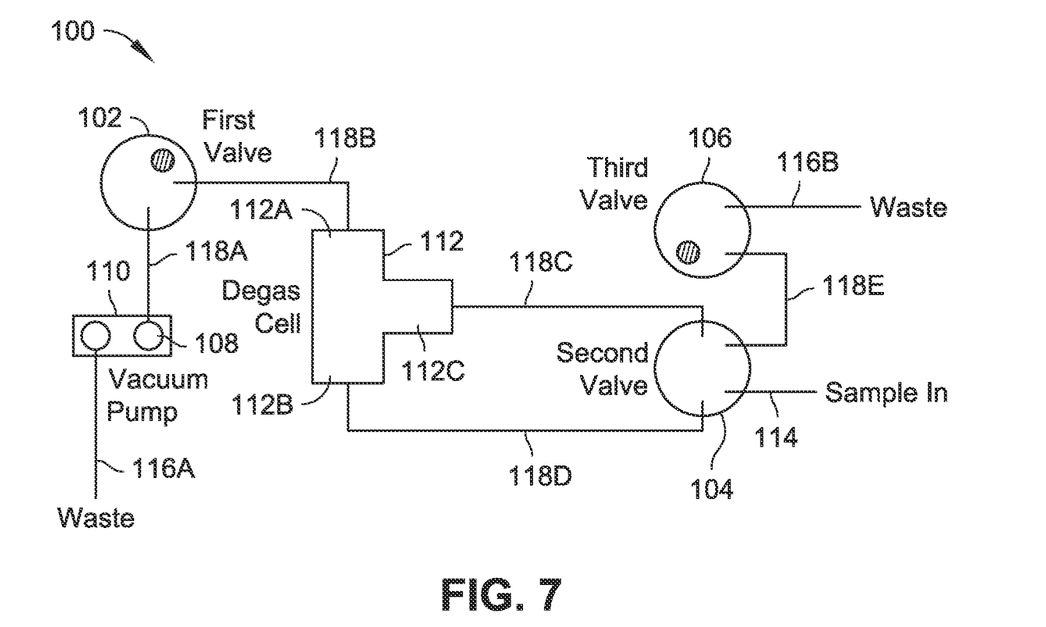
FIG. 7 is an environmental view of an analysis system designed to minimize bubble formation within a sample carrier fluid, in accordance with an example embodiment of the present disclosure.

Referring generally to FIGS. 7 through 12, an example analysis system 100 configured to degas a sample at a remote position and to thereby deter bubbles from agglomerating to form voids is shown and described. The analysis system 100, as seen in FIG. 7, can generally include at least one first valve 102 (e.g., a first multi-port valve, per the illustrated embodiment, which may be a V5-P3 valve), at least one second valve 104 (e.g., a second multi-port valve, per the illustrated embodiment, which may be a V4-P6 valve), at least one third valve 106 (e.g., a third multi-port valve, per the illustrated embodiment, which may be a V3-P3 valve), a vacuum pump 108, a manifold 110, a degassing cell 112 (e.g., a pillar tee connector, per the illustrated embodiment, with two longitudinally-spaced fluid connect ports and a lateral fluid connect port), a sample inlet 114, at least one waste outlet 116 (e.g., 116A, 116B), a plurality of fluid lines 118 (e.g., piping, tubes, etc.) to fluidly connect the various elements together, and a central analysis device (not shown) for testing the prepared sample-carrying fluid. In an embodiment, the vacuum pump 108 and the first waste outlet 116A are coupled with the manifold 110. The vacuum pump 108 can be fluidly coupled with the at least one first valve 102 via a first fluid line 118A. The system 100 can further include a degassing cell 112 (e.g., a ¾ inch pillar tee) oriented to define a top cell extension 112A, a bottom cell extension 112B, and a lateral cell extension 112C (i.e., the three connective portions associated with the degassing cell 112). The lateral cell extension 112C can extend from a side of the degassing cell 112 at a location between the top cell extension 112A and the bottom cell extension 112B. The portion of the analysis system 100 prior to the central analysis device (not shown) may also be considered to be a fluid transfer system. In an embodiment, the fluid transfer system can be a remote sample preparation and delivery system.

The at least one first valve 102 can be fluidly coupled with the top cell extension 112A of the degassing cell 112 via a second fluid line 118B (i.e., an upper fluid connect, relative to the degassing cell 112). The at least one first valve 102 can be configured to selectably connect the degassing cell 112 to a displacement gas flow or to a vacuum source. The degassing cell 112 can be separately and selectably coupled with the at least one second valve 104 using a third fluid line 118C (i.e., a lateral, central fluid connect, relative to the degassing cell 112), via the lateral cell extension 112C, and using a fourth fluid line 118D (i.e., a lower fluid connect, relative to the degassing cell 112), via the bottom cell extension 112B. The at least one second valve 104 can be fluidly coupled with the sample inlet 114 and with the at least one third valve 106 (e.g., the latter connection via a fifth fluid line 118E). The at least one second valve 104 can be selectably coupled with at least one of a source of a sample-carrying fluid, a transfer line configured to deliver a sample to an analysis device, or a second waste output. The second waste outlet 116B can be selectably connected to the at least one third valve 106, used to create a selectable fluid connection with the at least one second valve 104. In an embodiment, the at least one first valve 102, the at least one second valve 104, and/or the at least one third valve 106 may, respectively, be in the form of a multiport valve, per the illustrated embodiment. In an embodiment, the at least one first valve 102, the at least one second valve 104, and/or the at least one third valve 106 used herein may be, for example, pneumatically and/or electrically controlled and/or may be in a form of a distribution manifold. In an embodiment, the at least one first valve 102, the at least one second valve 104, and/or the at least one third valve 106 can also be in the form of mass flow controllers (MFC's) capable of electronically selectable flow control therethrough. In an embodiment, the at least one first valve 102, the at least one second valve 104, and/or the at least one third valve 106 can be in the form of a plurality of valves (e.g., instead of, for example, a corresponding multi-port valve).

The operation of the analysis system 100 is illustrated in FIGS. 8-12, in accordance with an embodiment of the present disclosure. With respect to FIG. 8, a sample flow 120 (e.g., a sample material in a carrier fluid (e.g., a carrier fluid including ammonium hydroxide and/or another volatile component) is directed into the bottom cell extension 112B and, thereby, through the degassing cell 112. The sample flow 120 (i.e., sample-carrier fluid) can reach the bottom cell extension 112B via the sample inlet 114, the at least one second valve 104, and the fourth fluid line 118D. With further respect to FIG. 8, the at least one first valve 102 can be configured to selectably direct a flow of nitrogen gas (i.e., $N_2$) or another inert gas, functioning as a displacement gas, into the top cell extension 112A via the second fluid line 118B, resulting in an amount of $N_2$ or other displacement gas being trapped under pressure at a top of the degassing cell 112. In an embodiment, the displacement gas and the pressure provided thereby can prevent and/or retard the sample-carrier fluid from flowing beyond the top cell extension 112A and toward the at least one first valve 102.

Figure 8:
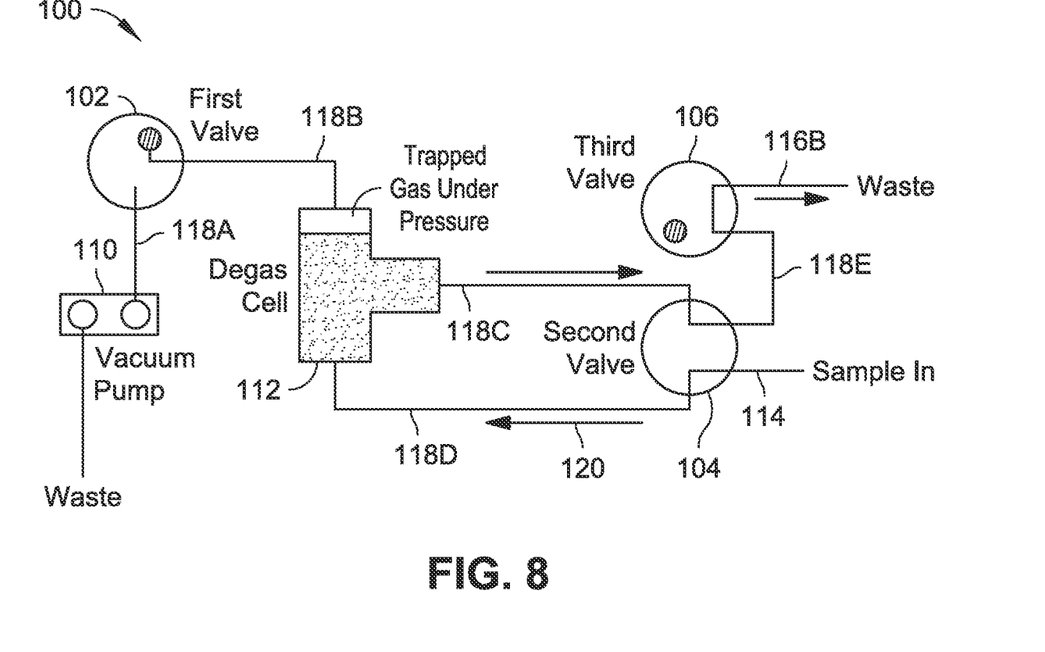
FIGS. 8-12 are a series of environmental views of the analysis system of FIG. 7, displaying a process by which the analysis system can be used to minimize bubble formation within tubing associated therewith.

In the situation presented in FIG. 8, the vacuum pump 108 is not fluidly connected to the degassing cell 112 (e.g., via the at least one first valve 102), and the sample flow 120 exiting the degassing cell 112 via its lateral cell extension 112C can ultimately be directed to the second waste outlet 116B via the second and at least one third valves 104, 106. That is, the influx of fluids (e.g., nitrogen/inert gas and sample flow) through the top and bottom of the degassing cell 112 can dictate that some or all such fluids be driven out through the lateral cell extension 112C (i.e., the only available escape/release location). In an embodiment, the degassing cell 112 can be filled partially or fully with the sample-carrying fluid before the displacement gas is introduced into the degassing cell 112. In an embodiment, the flow of the displacement gas may be increased to help force any sample-carrying fluid lying at or above third fluid line 118C out of the degassing cell 112 and ultimately toward the waste outlet 116E associated with the at least one third valve 106.

Figure 9:
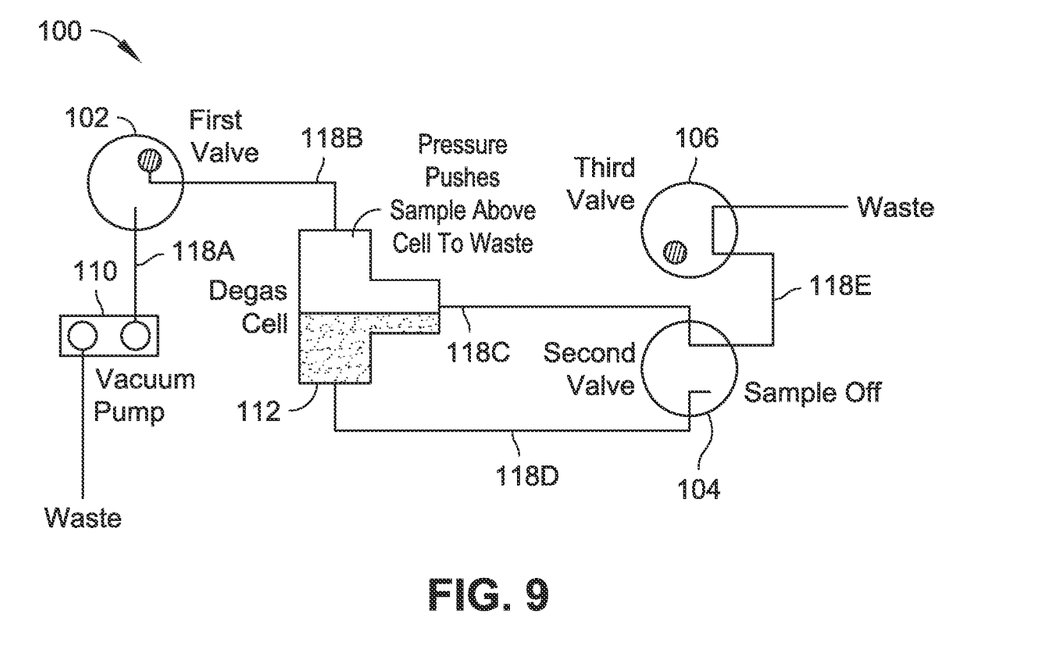
Figure 10:
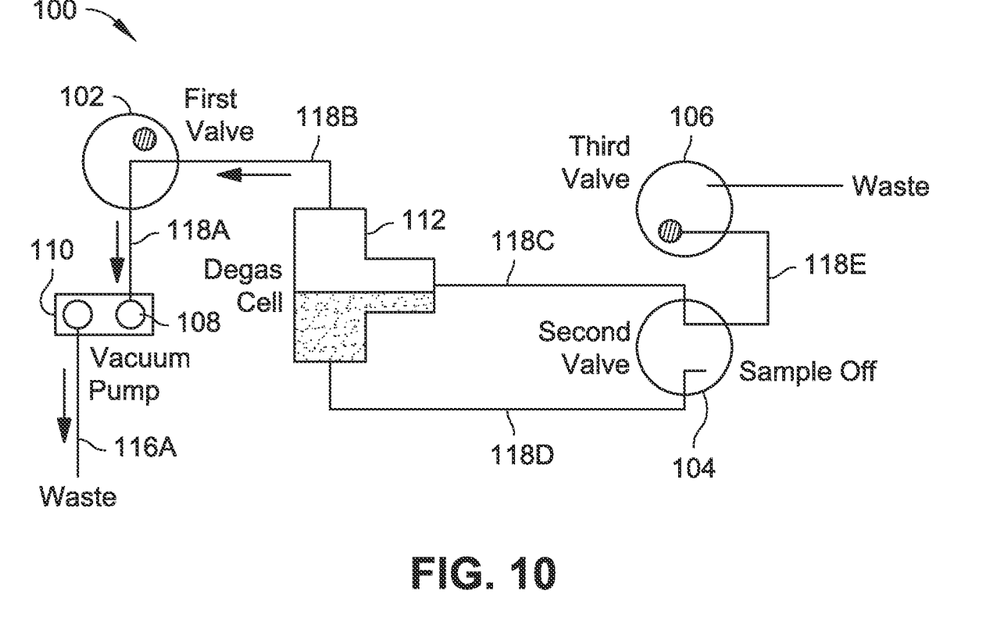

In a second step, as illustrated in FIG. 9, the flow connections remain the same, except the sample flow 120 is turned off, with the $N_2$ or other displacement gas flow continuing. The continued flow of nitrogen increases the pressure on the sample remaining in the degassing cell 112, pushing any of the sample lying at or above the third fluid line 118C from the degassing cell 112 and to waste. Once the excess sample within the degassing cell 112 has been pushed to waste, per FIG. 9, the flow combination illustrated in FIG. 10 can then be activated. In the situation of FIG. 10, the sample flow 120 from the sample inlet 114 remains off, the flow through at least one third valve 106 is opened toward an analysis device (not labelled) and no longer flowing through the second waste outlet 116B. Further, per FIG. 10, the $N_2$/displacement gas flow is disconnected, with the degassing cell 112 being subjected to a vacuum via the vacuum pump 108 via the at least one first valve 102, with the fluid pulled through the vacuum pump 108 directed to the first waste outlet 116A.

Figure 11:
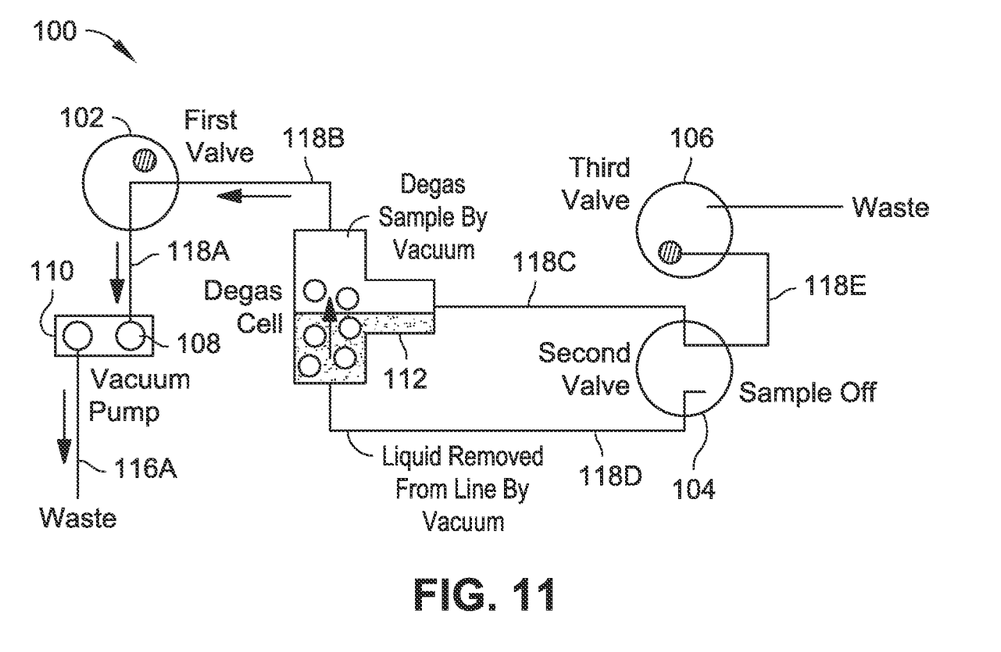

FIG. 11 maintains the flow connections set forth in FIG. 10, showing the results thereof. The flow mechanics prompted by the vacuum can cause all the liquid to be removed from the fourth fluid line 118D and the ammonia gas (NH3) and/or another gas (e.g., ammonium hydroxide or other volatile component) to be removed from the sample flow 120. Due to the vacuum, the sample flow 120 can actively bubble during the conditions of FIG. 11, and the degassing cell 112 can feel cold during this step (e.g., as part of the heat exchange associated with the ammonia and/or other gas evaporation).

Figure 12:
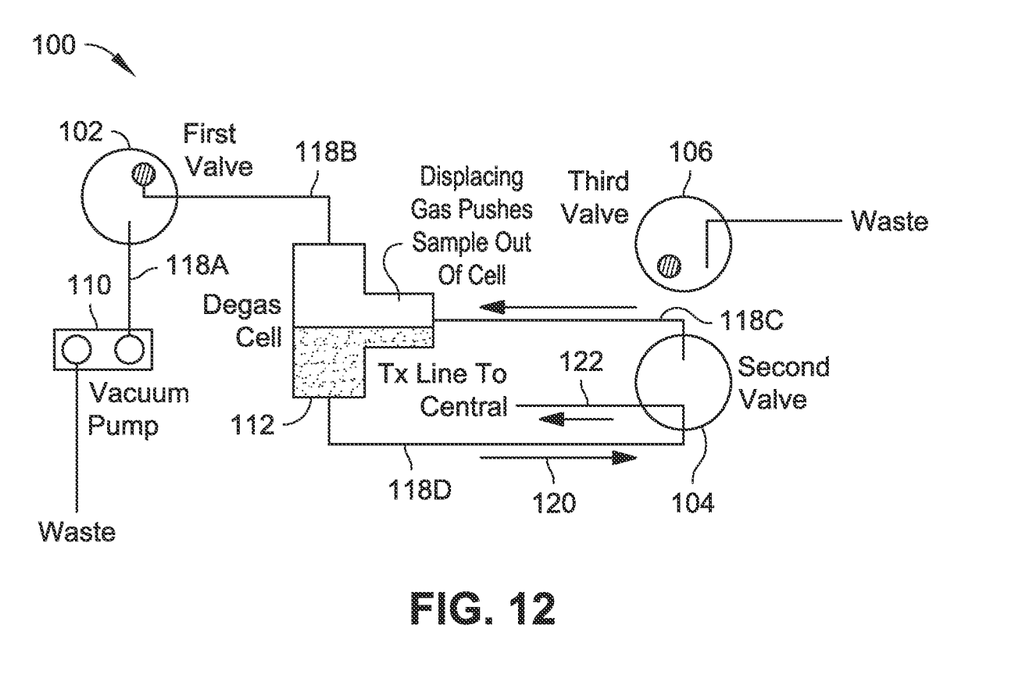

Finally, per the step illustrated in FIG. 12, the degassing cell 112 can be reconnected with the flow of $N_2$/displacement gas (e.g., via the first or at least one second valves 102, 104), disconnected from the vacuum flow, and disconnected from the at least one third valve 106. Additionally, flow to a transfer line 122 to a central analysis device (not shown) can be opened at the at least one second valve 104. As a result, the pressure from the $N_2$/displacement gas flow can push the sample, now carrying no or substantially no ammonia/ammonium hydroxide and/or other volatile component (at least not enough to generate any voids), as a sample flow 120 through the fourth fluid line 118D, into the at least one second valve 104, and into the transfer line 122. The portion of the system 100 capable of delivering to the transfer line 122 and the central analysis device may be considered to be a remote flow handling system.

In an embodiment, upon loading the sample into the analysis system 100, the ammonium hydroxide sample can be properly degassed in about seven (7) minutes before transferring the sample for analysis. In some embodiments, after degassing, there was found to be no need to permit the sample to rest in the loop, as opposed to a situation without degassing. Other samples incorporating other volatile substances may take a different length of time to degas. Without degassing, the sample must be permitted to rest in the loop to keep the ICPMS plasma on in cool plasma. Upon using the present system to degas the ammonium hydroxide sample, no noticeable voids may be seen in the analysis loop after transfer. Upon degassing, some small $NH_4OH$ and/or $NH_3$ bubbles may still form but at a level so as not to appear to affect testing (i.e., substantially all ammonia is removed prior analysis, at least to a point where the remaining ammonia/ammonium hydroxide remaining does not interfere with testing), at which point the sample can be considered sufficiently degassed. In an embodiment, an upgrade kit for transfer remotes using two valves and a vacuum pump is within the scope of this present system, with all parts able to mount to the existing blanks on the remote fluid handling system.

In an embodiment, the analysis system 100 (e.g., implemented as an upgrade kit) may be used for thinner samples or with other samples where degassing may prove necessary (e.g., not just with ammonia-based samples but, for example, when any potentially volatile (i.e., high vapor pressure) sample carrier is employed). In an embodiment, it is to be understood that the present system may be used with any analysis system where degassing of the sample may prove necessary to deter void formation. In an embodiment, a suitable gas (e.g., an inert gas) may be used as the displacement gas, in place of nitrogen in the embodiment discussed herein. In some embodiments, the sample may be heated (e.g., prior to entry into the analysis system 100 and/or at the degassing cell 112) to promote degassing. In an embodiment, the sample can be cooled at the receiving point of the central, particularly if the sample is expressly heated to promote degassing.

In embodiments, a system controller (not shown) can be available for controlling the operation of the analysis system 100 (e.g., valve and/or vacuum operation; and/or any related flow inputs). The system controller can include a processor, a memory, and a communications interface. In an embodiment, the analysis system 100 can include one or more sensors (e.g., flow sensors, pressure sensors, etc.) able to work in conjunction with the system controller, as needed to achieve the desired functionality of the system. The processor provides processing functionality for at least the controller and can include any number of processors, microcontrollers, circuitry, field programmable gate array (FPGA) or other processing systems, and resident or external memory for storing data, executable code, and other information accessed or generated by the controller. The processor can execute one or more software programs embodied in a non-transitory computer readable medium that implement techniques described herein. The processor is not limited by the materials from which it is formed or the processing mechanisms employed therein and, as such, can be implemented via semiconductor(s) and/or transistors (e.g., using electronic integrated circuit (IC) components), and so forth.

The memory can be an example of tangible, computer-readable storage medium that provides storage functionality to store various data and or program code associated with operation of the controller, such as software programs and/or code segments, or other data to instruct the processor, and possibly other components of the system 100, to perform the functionality described herein. Thus, the memory can store data, such as a program of instructions for operating the system 100 (including its components), and so forth. It should be noted that while a single memory is described, a wide variety of types and combinations of memory (e.g., tangible, non-transitory memory) can be employed. The memory can be integral with the processor, can comprise stand-alone memory, or can be a combination of both.

Some examples of the memory can include removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, remove (e.g., server and/or cloud) memory, and so forth. In implementations, memory can include removable integrated circuit card (ICC) memory, such as memory provided by a subscriber identity module (SIM) card, a universal subscriber identity module (USIM) card, a universal integrated circuit card (UICC), and so on.

The communications interface can be operatively configured to communicate with components of the system 100. For example, the communications interface can be configured to transmit data for storage by the system 100, retrieve data from storage in the system 100, and so forth. The communications interface can also be communicatively coupled with the processor to facilitate data transfer between components of the system 100 and the processor. It should be noted that while the communications interface is described as a component of controller, one or more components of the communications interface can be implemented as external components communicatively coupled to the system 100 or components thereof via a wired and/or wireless connection. The system 100 or components thereof can also include and/or connect to one or more input/output (I/O) devices (e.g., via the communications interface), such as a display, a mouse, a touchpad, a touchscreen, a keyboard, a microphone (e.g., for voice commands) and so on.

The communications interface and/or the processor can be configured to communicate with a variety of different networks, such as a wide-area cellular telephone network, such as a cellular network, a 3G cellular network, a 4G cellular network, a 5G cellular network, or a global system for mobile communications (GSM) network; a wireless computer communications network, such as a WiFi network (e.g., a wireless local area network (WLAN) operated using IEEE 802.11 network standards); an ad-hoc wireless network, an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface can be configured to communicate with a single network or multiple networks across different access points. In a specific embodiment, a communications interface can transmit information from the controller to an external device (e.g., a cell phone, a computer connected to a WiFi network, cloud storage, etc.). In another specific embodiment, a communications interface can receive information from an external device (e.g., a cell phone, a computer connected to a WiFi network, cloud storage, etc.).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A fluid transfer system, comprising:
a degassing cell oriented so as to define a top cell extension, a bottom cell extension, and a lateral cell extension, the lateral cell extension extending from a side of the degassing cell at a location between the top cell extension and the bottom cell extension; and
a valve system fluidly coupled with the top cell extension, the lateral cell extension, and separately fluidly connected with the bottom cell extension, the valve system configured to selectably connect the top cell extension a displacement gas flow or to a vacuum source, the valve system selectably coupled with at least one of a source of a sample-carrying fluid, a transfer line configured to deliver a sample to an analysis device, or a waste output.

2. The fluid transfer system of claim 1, wherein the valve system is configured to provide a flow of the sample-carrying fluid to the degassing cell via the bottom cell extension, and wherein the valve system is configured to selectably provide a displacement gas flow into the top cell extension upon introduction of the sample-carrying fluid into the degassing cell.

3. The fluid transfer system of claim 2, wherein the valve system is configured to selectably receive a flow of the sample-carrying fluid from the lateral cell extension of the degassing cell and to direct the received sample-carrying fluid to the waste output, the received sample-carrying fluid being pushed out of the lateral cell extension by the flow of the displacement gas into the top cell extension.

4. The fluid transfer system of claim 3, wherein the valve system is further configured to selectably stop directing the flow of the sample-carrying fluid from the lateral cell extension to the waste output when a level of the sample-carrying fluid in the degassing cell drops below a position of a fluid interconnect extending between the lateral cell extension and the at least one second valve.

5. The fluid transfer system of claim 1, wherein the valve system is configured to selectably connect with a vacuum source when the degassing cell is filled with the sample-carrying fluid at or below a position of a fluid interconnect extending between the lateral cell extension and the at least one second valve, the vacuum source configured to degas the sample-carrying fluid.

6. The fluid transfer system of claim 5, wherein the vacuum source is fluidly connected to a second waste outlet.

7. The fluid transfer system of claim 5, wherein the valve system is configured to selectably connect to the displacement gas flow upon degassing of the sample-carrying fluid and at this stage to direct the degassed sample-carrying fluid to a transfer line for a central analysis device.

8. The fluid transfer system of claim 7, wherein the displacement gas flow is sufficient to push the degassed sample-carrying fluid out of the bottom cell extension and toward the transfer line.

9. The fluid transfer system of claim 1, wherein the valve system is configured to selectably connect with a source of nitrogen gas, the nitrogen gas serving as the displacement gas.

10. A fluid transfer process, comprising:
providing a fluid transfer system including a degassing cell and a valve system, the degassing cell oriented so as to define a top cell extension, a bottom cell extension, and a lateral cell extension, the lateral cell extension extending from a side of the degassing cell at a location between the top cell extension and the bottom cell extension, the valve system fluidly coupled with the top cell extension, the lateral cell extension via a lateral fluid connector, and separately fluidly connected with the bottom cell extension;
providing a flow of a sample-carrying fluid into the degassing cell through the bottom cell extension; and
introducing a flow of a displacement gas into the degassing cell via the top cell extension upon beginning a flow of the sample-carrying fluid into the degassing cell, the flow of displacement gas preventing any escape of the sample-carrying fluid through the top cell extension.

11. The fluid transfer process of claim 10, wherein the sample-carrying fluid is provided to a level above the lateral fluid connector extending from the lateral cell extension to valve system, the flow of the sample-carrying fluid stopped upon reaching the level above the lateral fluid connector, the lateral fluid connector then selectably connected via the valve system to a first waste outlet, the flow of the displacement gas pushing any sample-carrying fluid at or above the lateral fluid connector into the lateral flow connector and ultimately toward the first waste outlet.

12. The fluid transfer process of claim 11, further comprising stopping the directing of the sample-carrying fluid to the waste outlet when a level of the sample-carrying fluid drops below the lateral fluid connector.

13. The fluid transfer process of claim 12, further comprising selectably connecting the valve system with a vacuum source instead of the flow of the displacement gas to generate a vacuum pressure in the degassing cell, the vacuum pressure promoting a degassing of the sample-carrying fluid.

14. The fluid transfer process of claim 13, wherein the sample-carrying fluid comprises ammonium hydroxide, and wherein a gas comprising at least one of ammonium hydroxide or ammonia is degassed therefrom upon application of the vacuum pressure.

15. The fluid transfer process of claim 13, wherein, after degassing the sample-carrying fluid, the displacement gas is again supplied to the degassing cell via the valve system, and wherein the valve system redirects the flow of the displacement gas to a transfer line for an analysis device.

16. The fluid transfer process of claim 15, wherein the flow of the displacement gas is sufficient to push the degassed sample-carrying fluid out of the bottom cell extension and toward the transfer line.

17. The fluid transfer process of claim 10, wherein the valve system is configured to selectably connect with a source of nitrogen gas, the nitrogen gas serving as the displacement gas.

* * * * *